(12) United States Patent
Giudiceandrea et al.

(10) Patent No.: US 11,752,524 B2
(45) Date of Patent: Sep. 12, 2023

(54) METHOD FOR RECOVERING A POSTERIORI INFORMATION ABOUT THE OPERATION OF A PLANT FOR AUTOMATIC CLASSIFICATION AND SORTING OF FRUIT

(71) Applicant: BIOMETIC S.R.L., Bressanone (IT)

(72) Inventors: Federico Giudiceandrea, Bressanone (IT); Enrico Ursella, Mestre (IT); Davide Barbiero, Mestre (IT)

(73) Assignee: BIOMETIC S.R.L., Bressanone (IT)

( * ) Notice: Subject to any disclaimer, the term of this patent is extended or adjusted under 35 U.S.C. 154(b) by 24 days.

(21) Appl. No.: 17/473,626

(22) Filed: Sep. 13, 2021

(65) Prior Publication Data
US 2022/0080465 A1 Mar. 17, 2022

(30) Foreign Application Priority Data

Sep. 15, 2020 (IT) .......................... 102020000021742

(51) Int. Cl.
*B07C 5/342* (2006.01)
*G06V 10/46* (2022.01)
(Continued)

(52) U.S. Cl.
CPC .............. *B07C 5/342* (2013.01); *B07C 5/362* (2013.01); *G06F 18/217* (2023.01);
(Continued)

(58) Field of Classification Search
CPC ... B07C 5/342; B07C 5/362; B07C 2501/009; G06F 18/217; G06F 18/241; G06T 7/004;
(Continued)

(56) References Cited

U.S. PATENT DOCUMENTS

| 9,574,997 | B2 | 2/2017 | Fredlund et al. |
| 2013/0229647 | A1 | 9/2013 | Fredlund et al. |
| 2020/0293814 | A1 | 9/2020 | Shniberg et al. |

FOREIGN PATENT DOCUMENTS

| EP | 2261643 A1 | 8/2014 |
| WO | 2012048897 A1 | 4/2012 |
| WO | 2019106638 A1 | 6/2019 |

OTHER PUBLICATIONS

Zhang, Z., "A Flexible New Technique For Camera Calibration", IEEE Transactions on Pattern Analysis and Machine Intelligence, vol. 22, No. 11, Nov. 2020, pp. 1330-1334.
(Continued)

*Primary Examiner* — Michael McCullough
*Assistant Examiner* — Jessica L Burkman
(74) *Attorney, Agent, or Firm* — Pearne & Gordon LLP; Michelle E. Tochtrop

(57) ABSTRACT

A method for recovering a posteriori information about the operation of a plant for automatic classification and sorting of fruit, wherein digital images of a reference piece of fruit previously processed by means of the plant are processed so as to identify its first group of individualizing features, which are then compared with each of a series of second groups of individualizing features each corresponding to a different piece of fruit processed by the plant, in order to establish a match; then, there is extraction from an electronic database of operating information which corresponds to information used or generated by the plant for automatic classification and sorting for classification of the relative processed piece of fruit and/or to information about sorting of the relative piece of fruit processed by the plant for automatic classification and sorting, where in the electronic database the operating information is associated with the second group of individualizing features for which during
(Continued)

the comparison step the match with the first group of individualizing features has been established.

26 Claims, 10 Drawing Sheets

(51) Int. Cl.
  *B07C 5/36* (2006.01)
  *G06T 7/00* (2017.01)
  *G06F 18/21* (2023.01)
  *G06F 18/241* (2023.01)
  *G06V 20/68* (2022.01)

(52) U.S. Cl.
  CPC .......... *G06F 18/241* (2023.01); *G06T 7/0004* (2013.01); *G06V 10/462* (2022.01); *B07C 2501/009* (2013.01); *G06T 2207/30128* (2013.01); *G06T 2207/30188* (2013.01); *G06V 20/68* (2022.01)

(58) Field of Classification Search
  CPC ........... G06T 2207/30128; G06T 2207/30188; G06V 20/68
  See application file for complete search history.

(56) References Cited

OTHER PUBLICATIONS

Hinton, G., et al., "Reducing the Dimensionality of Data With Neural Networks", Science, vol. 313, Jul. 28, 2006, pp. 504-507.
Nanni, L., et al., "Handcrafted vs. Non-handcrafted Features for Computer Vision Classification", Pattern Recognition, vol. 17, 2017, pp. 158-172.
He, K., et al., "Deep Residual Learning for Image Recognition", Proceedings of the IEEE Conference on Computer Vision and Pattern Recognition, 2016, pp. 770-778.
Wikipedia, "Structure from Motion", https://en.wikipedia.org/wiki/, Sep. 9, 2021, pp. 1-7.
Wikipedia, "Point set registration", https://en.wikipedia.org/wiki/, Sep. 9, 2021, pp. 1-11.
Wikipedia, "Scale-invariant feature transform", https://en.wikipedia.org/wiki/, Sep. 9, 2021, pp. 1-18.

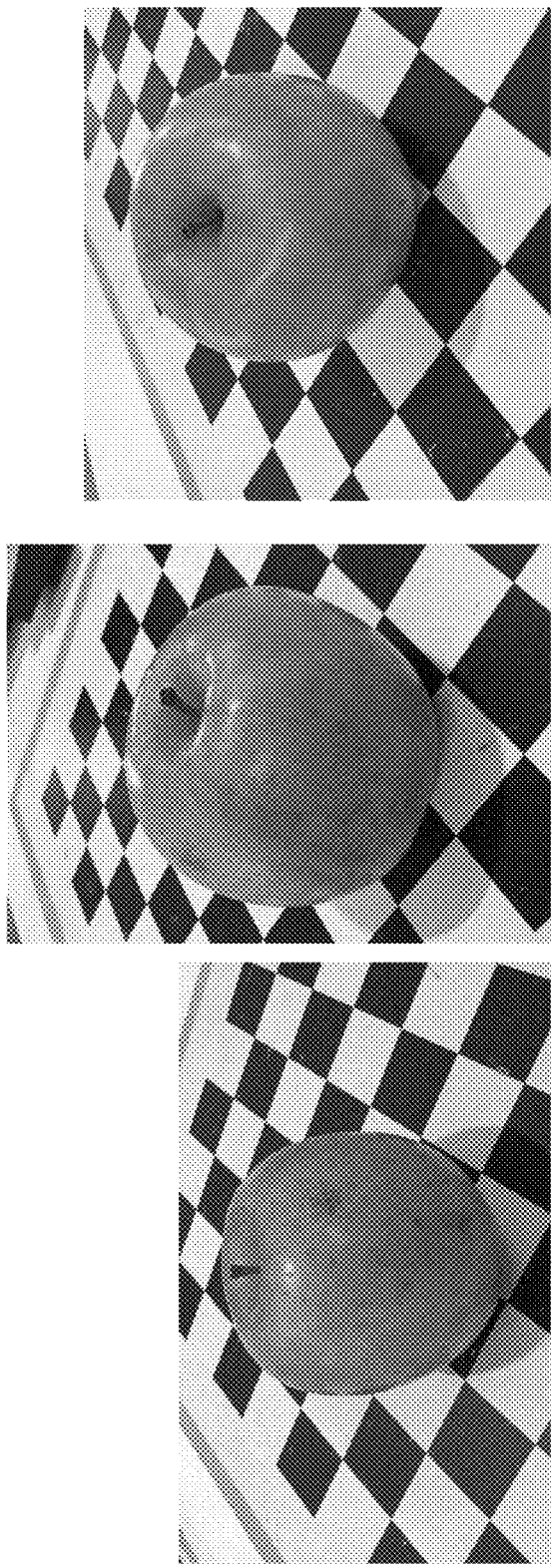
FIG. 10
FIG. 11
FIG. 12
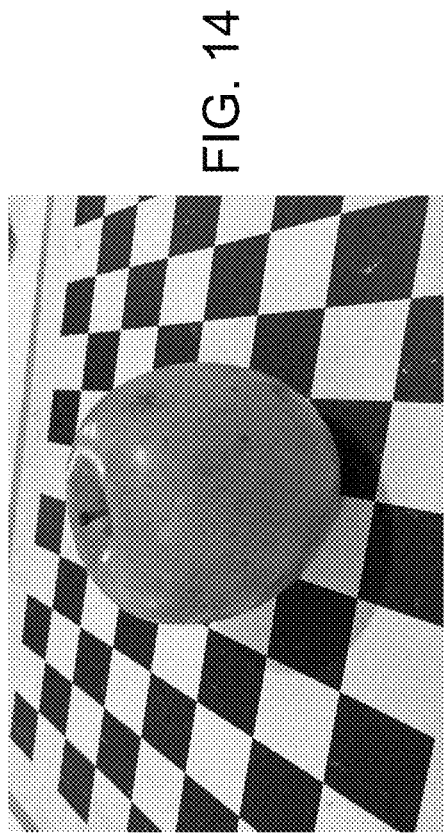
FIG. 13
FIG. 14

METHOD FOR RECOVERING A POSTERIORI INFORMATION ABOUT THE OPERATION OF A PLANT FOR AUTOMATIC CLASSIFICATION AND SORTING OF FRUIT

This invention relates to a method for recovering a posteriori information about the operation of a plant for automatic classification and sorting of fruit, in particular for reconstructing a posteriori how a specific piece of fruit has been classified and sorted by the plant and if necessary intervening on the plant in the event of anomalies.

In plants for automatic classification and sorting, the pieces of fruit are made to pass through one or more analysis stations in each one of which one or more scanners are mounted which are capable of acquiring various types of images of each piece of fruit, of determining their shape and dimensions, or of determining their internal structure. Generally, in order to be able to acquire various images of each piece of fruit, the plant is configured to feed the pieces of fruit through the analysis station while at the same time making the piece of fruit rotate on itself.

A specific software run by a computer, analyses the electronic data supplied by the various analysis stations and assigns a classification to each piece of fruit. Based on the classification received, each piece of fruit is then fed to a specific outfeed zone of the plant by means of a conveying system and a system for monitoring its position.

In the context of this description and of the appended claims, when reference is made to the assignment of a classification to each piece of fruit, it may mean either that for each piece of fruit a specific qualitative class is effectively determined, or, more simply, that for each piece of fruit an outfeed zone to which it must be sent by the plant is identified.

The type of classification of the piece of fruit may also vary depending on the type of production required (obviously it will be different for fruit intended for sale compared with fruit intended for industrial processing).

At present, the quality of the piece of fruit, and therefore its classification, are determined in various ways. In some applications artificial vision algorithms are used, in particular neural networks; the operating parameters may be set either by the installer or by the user.

Generally, the setting of the algorithm parameters, of the weights of the neural networks, as well as of the final selection parameters, is performed starting with the definition of several features (for example the maximum percentage of russet on the surface of an apple), but very often also by starting with examination of the pieces of fruit themselves.

In fact, one important process is that of initially adjusting the plant, pre-selecting pieces of fruit of a certain class and scanning them. In this way a database of scans of pieces of fruit belonging to the different classes is created. Using that database to make the plant operate virtually, it is possible to verify the efficiency of the system, but above all it is possible to optimise its performance by automatically or manually adjusting the parameters of the algorithms and the weights of the neural networks until the plant is capable of correctly autonomously classifying all of the pieces of fruit in the database.

Another very important process for optimising the operation of a plant for automatic classification and sorting, is to monitor and identify the presence of pieces of fruit which have been incorrectly selected, that is to say, pieces of fruit which have been sorted to an outfeed zone different from that to which they should have been sorted.

There may be many reasons why a piece of fruit may be incorrectly selected. For example, the scanner may not succeed in correctly acquiring the images of the piece of fruit (Reason 1—for example the piece of fruit should roll in front of the video cameras in such a way that it can be seen from all sides, but for some reason it does not roll enough).

Or the defect present is not detectable with the sensors available (Reason 2—for example a hole in the peel which is too small for the resolution of the video cameras).

Furthermore, the algorithms may not be capable of detecting the defect (Reason 3—for example because, during the step of training the neural networks, not enough examples with that type of defect had been supplied).

In some cases the incorrect classification may be due to incorrect settings entered by the operator (Reason 4).

In contrast, in other cases the classification may be correct, but mechanical problems may occur while effectively directing the piece of fruit into the outfeed for which the command was issued (Reason 5).

Understanding the reason for the incorrect sorting of a piece of fruit allows the system to be appropriately corrected and, therefore, improved.

For example, if the reason for the error is Reason 3 indicated above, and deep neural networks are used, it is possible to put it right quickly and effectively. In fact, due to their intrinsic structure, these systems are capable of improving their performance by simply analysing a sufficient number of samples from which they can learn the correct classification. Consequently, supplying new samples to be used for additional training, which correspond to pieces of fruit for which the previous version made mistakes, is the best way to obtain a new, improved version of the system. In some cases it may be enough to supply all of the images of the piece of fruit and the correct final results, in others intervention may be necessary by an expert who also indicates in which portion, of which image, the feature that should have been detected (for example an undetected bruise) was located.

However, with the plants currently present on the market, it is often complex, if not impossible, to understand why the plant made a mistake.

The only method currently used to carry out this process consists of collecting the incorrect pieces of fruit and again making them pass through the one or more scanners so as to attempt to recreate the error and be able to see it in real time.

However, this approach has significant disadvantages.

First, it requires an interruption of the normal operation of the plant in order to be able to insert the piece of fruit again and to be able to monitor its classification and sorting in a precise way.

But the main problem is that this method does not allow identification of the reason for the incorrect sorting if it is Reason 1 or Reason 5 which will probably not be repeated during the second passage of the piece of fruit in the plant. In the case of Reason 3 too, the problems may not arise again, because during the second passage the piece of fruit will be presented to the scanner in a position different from its position during the first passage, and the new images could be more or less favourable for the algorithms used.

In this context, the technical purpose which forms the basis of this invention is to overcome the above-mentioned disadvantages.

In particular the technical purpose of this invention it so allow a precise understanding of the reasons why a certain piece of fruit has been classified and/or sorted in a certain way by the plant.

The idea which forms the basis of this invention has been that of providing a method for being able to recover a posteriori information about the operation of the plant for automatic classification and sorting relative to each specific piece of fruit.

In fact, the technical purpose specified and the aims indicated have been substantially achieved by a method for recovering a posteriori information about the operation of a plant for automatic classification and sorting of fruit as described in the appended claims.

Further features and the advantages of this invention are more apparent from the detailed description of several preferred, non-limiting embodiments of a method for recovering a posteriori information about the operation of a plant for automatic classification and sorting of fruit, illustrated with reference to the accompanying drawings, in which.

Figure 1:
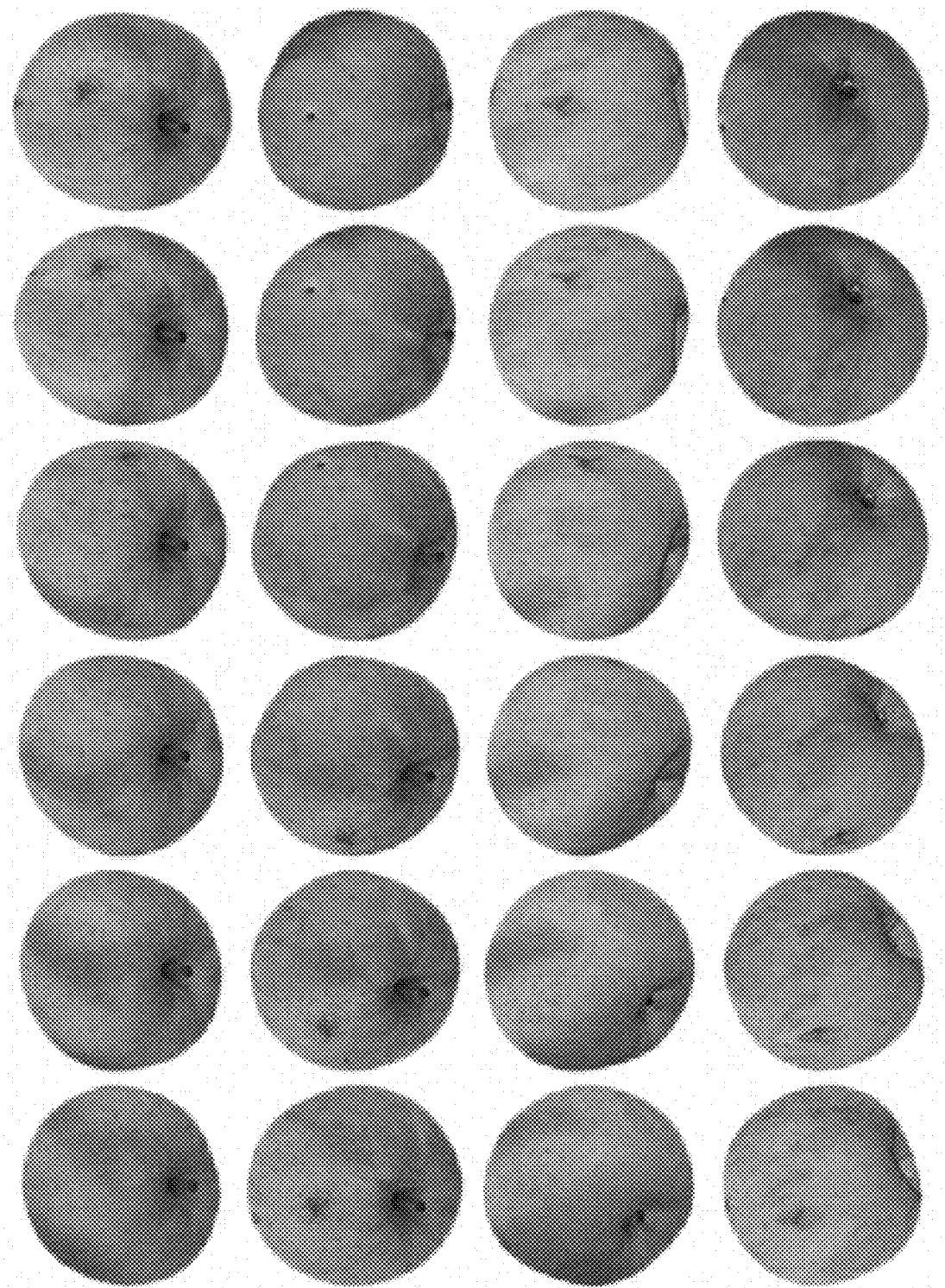
FIG. 1 shows in greyscale, a plurality of digital images (originally in colour) of a same piece of fruit (apple), which were acquired in the visible light band from a plurality of different viewpoints distributed around the piece of fruit as occurs following rolling of the piece of fruit on itself during the acquisition of the various images.
Figure 3:
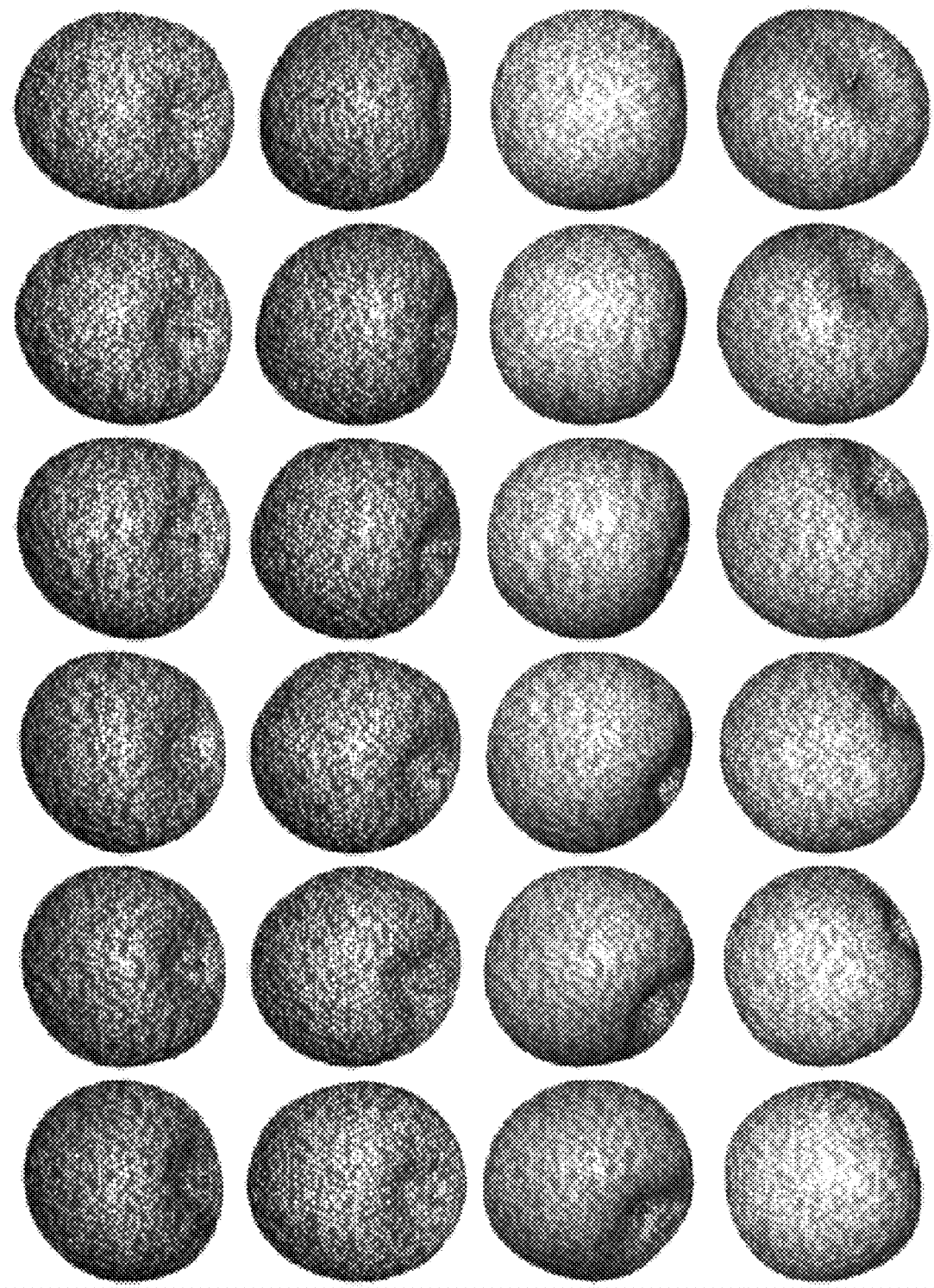
FIG. 3 shows a plurality of digital images of the same piece of fruit as in FIG. 1, which are representative of the laser scatter on the surface of the piece of fruit, which were also acquired from a plurality of different viewpoints distributed around the piece of fruit, that is to say, during rolling of the piece of fruit on itself.
Figure 5:
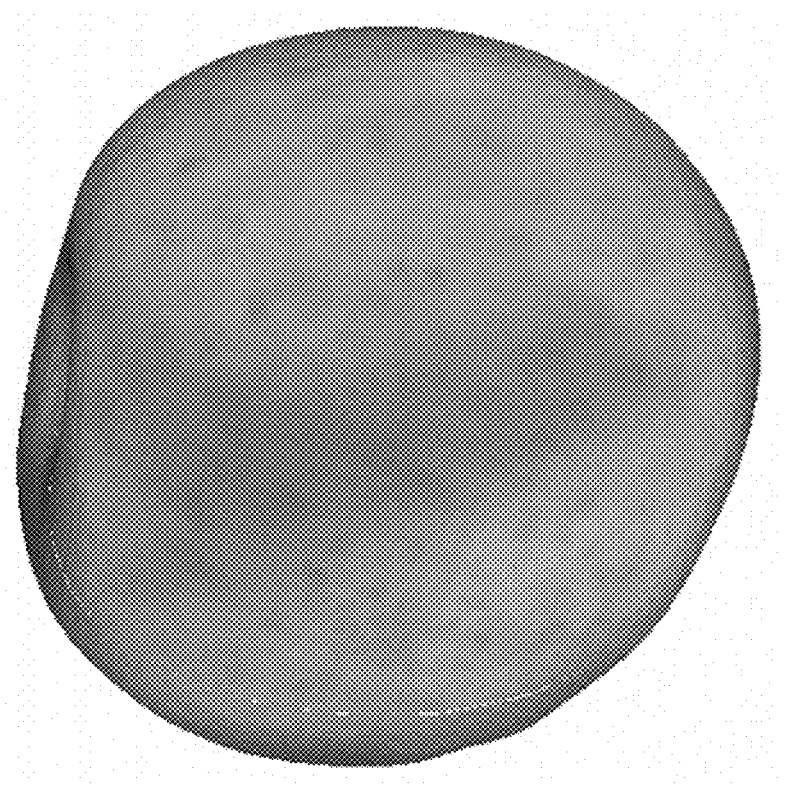
Figure 4:
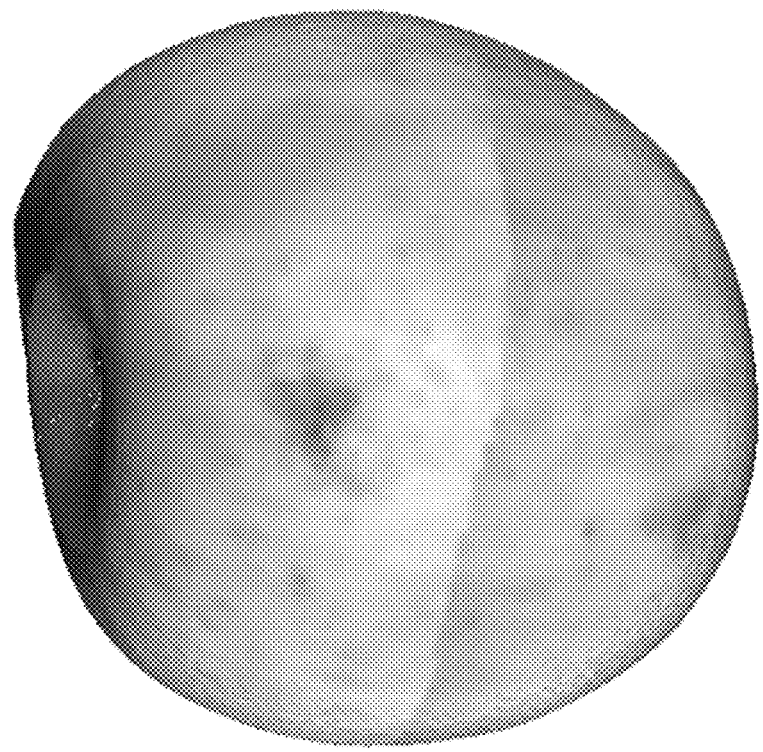
Figure 7:
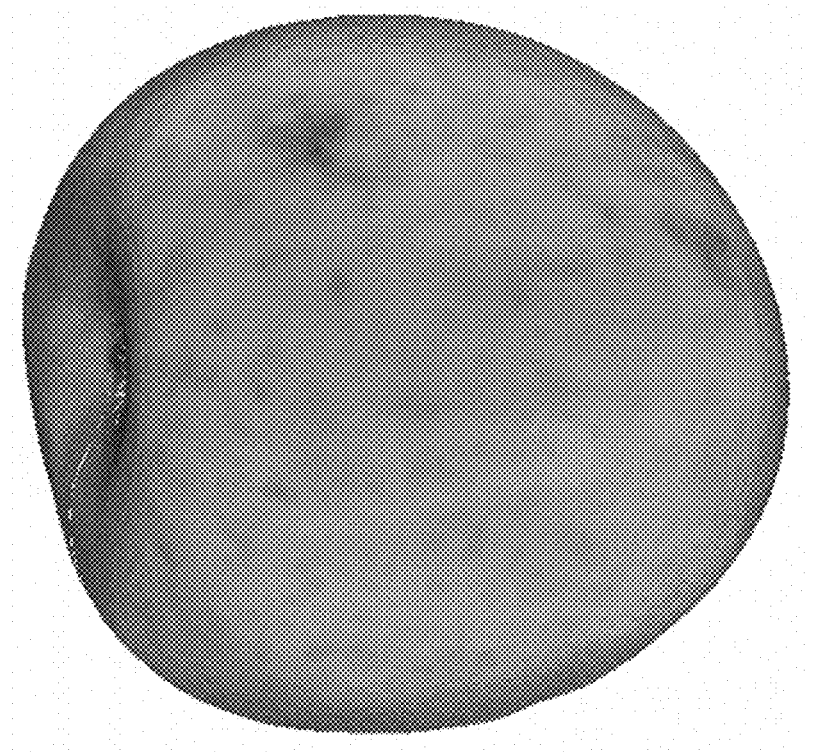
Figure 6:
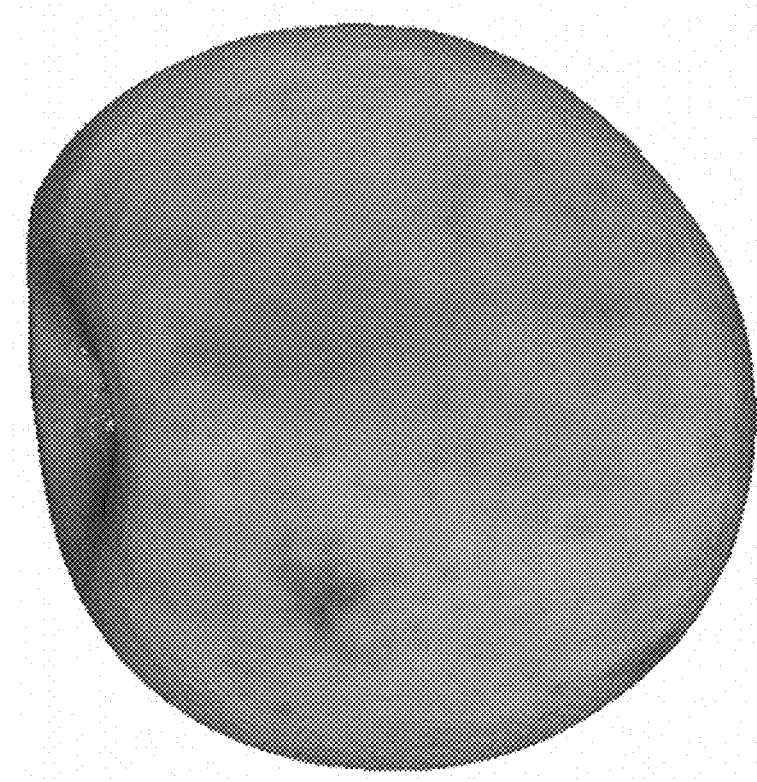
Figure 9:
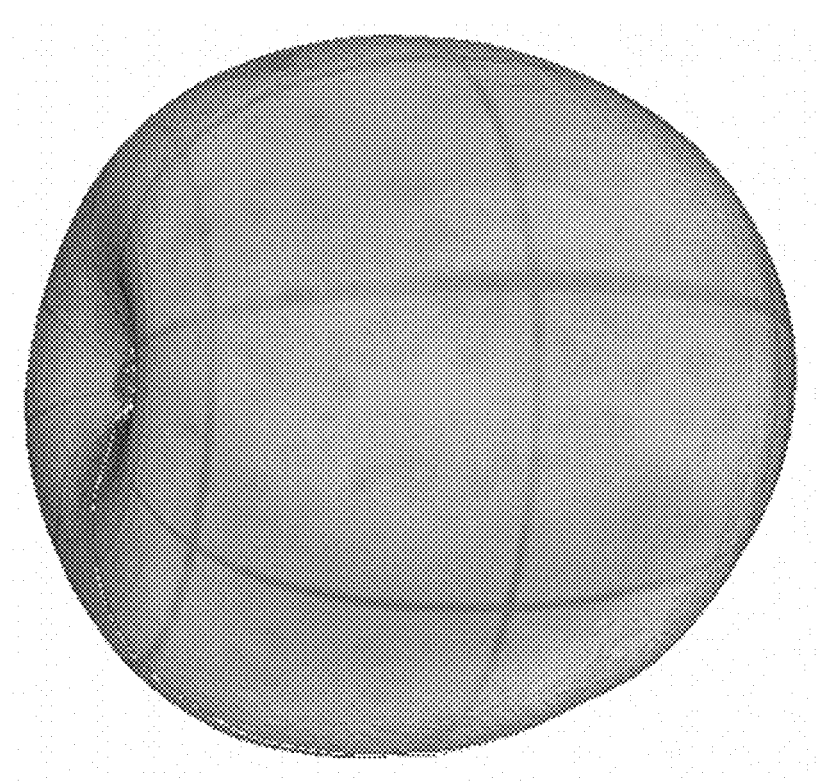
Figure 8:
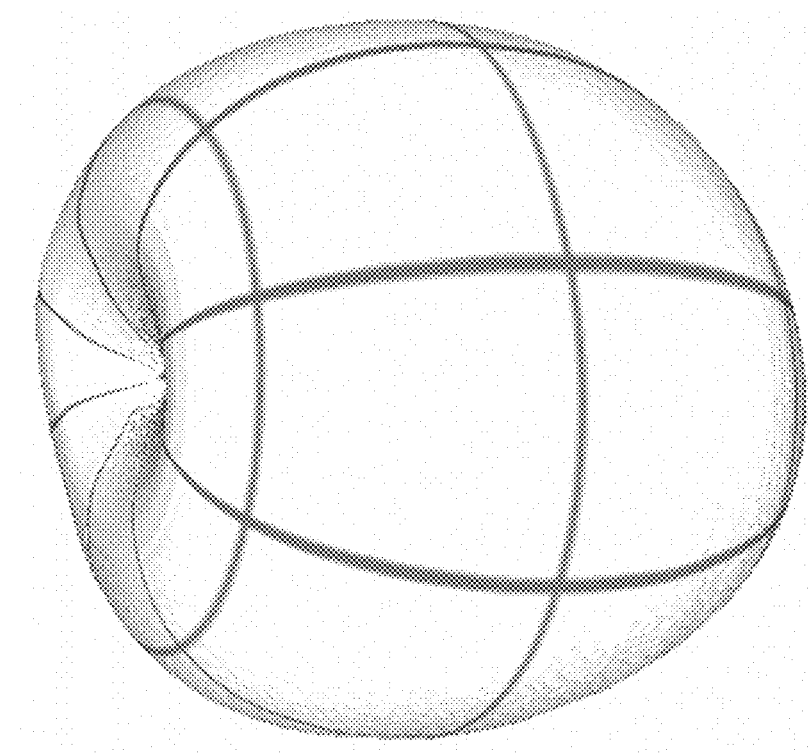
Figure 16:
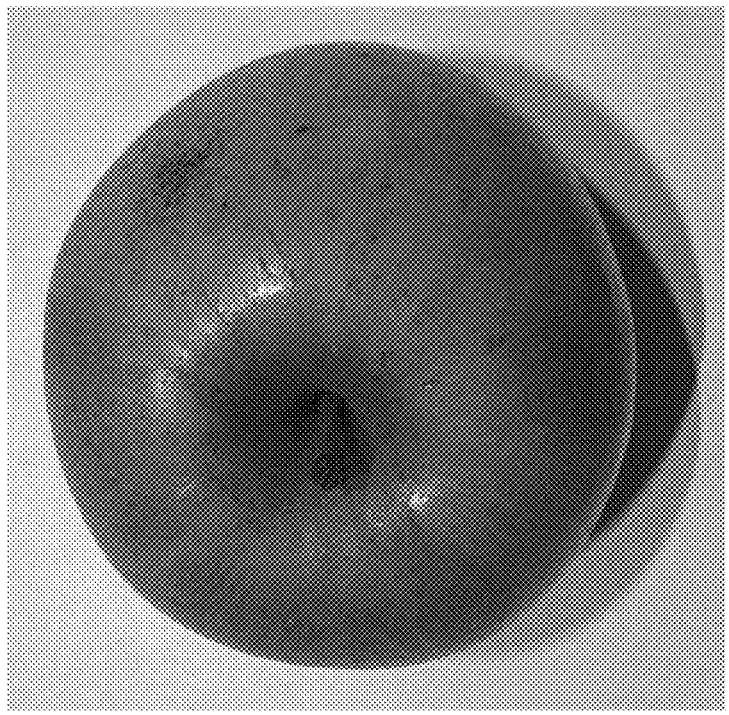
Figure 15:
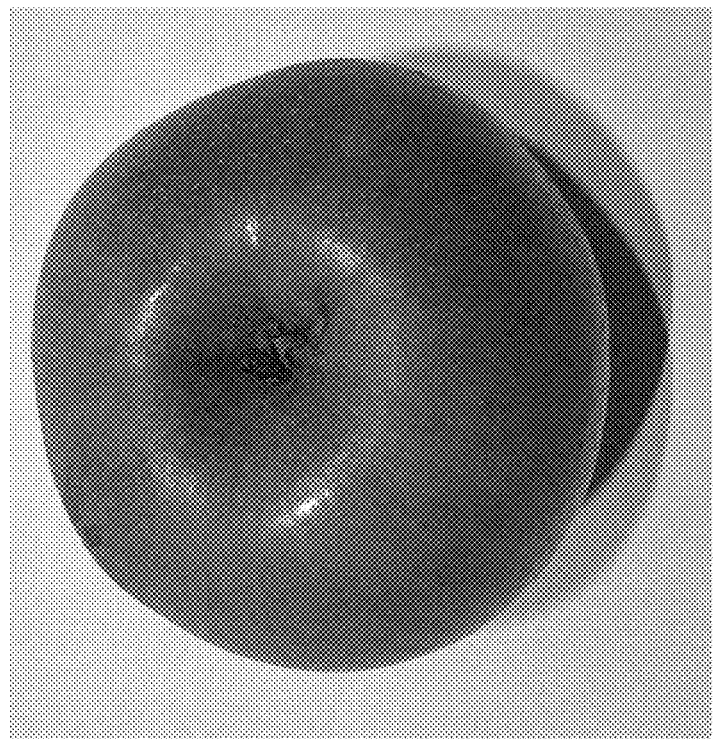
Figure 17:
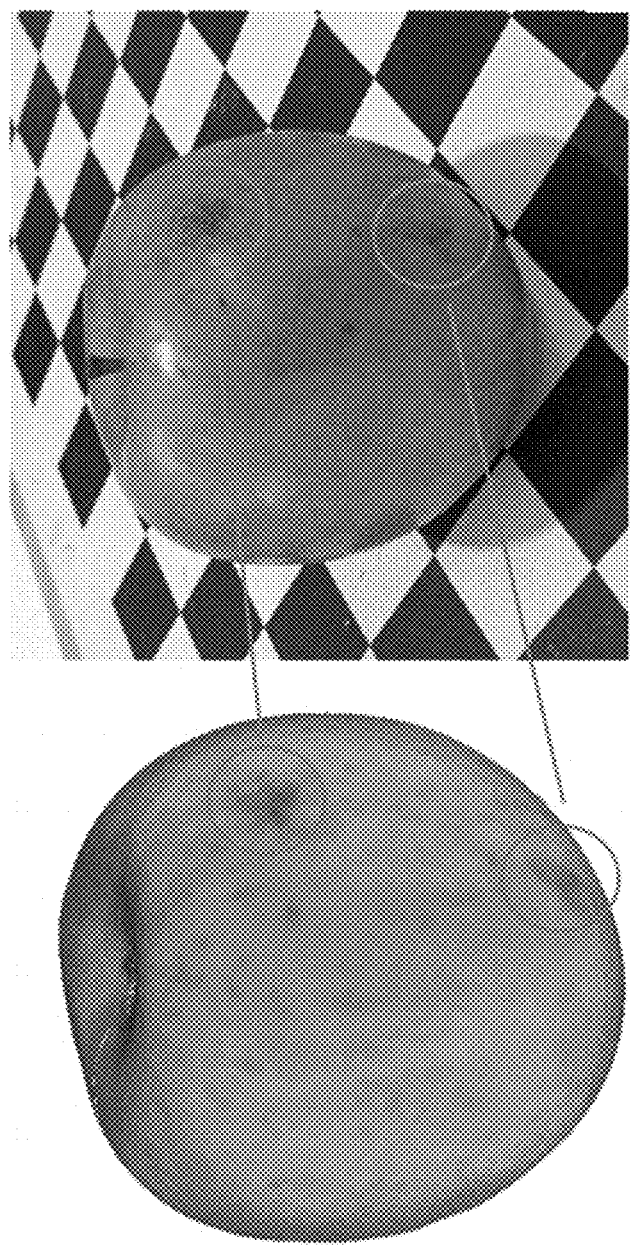
Figure 18:
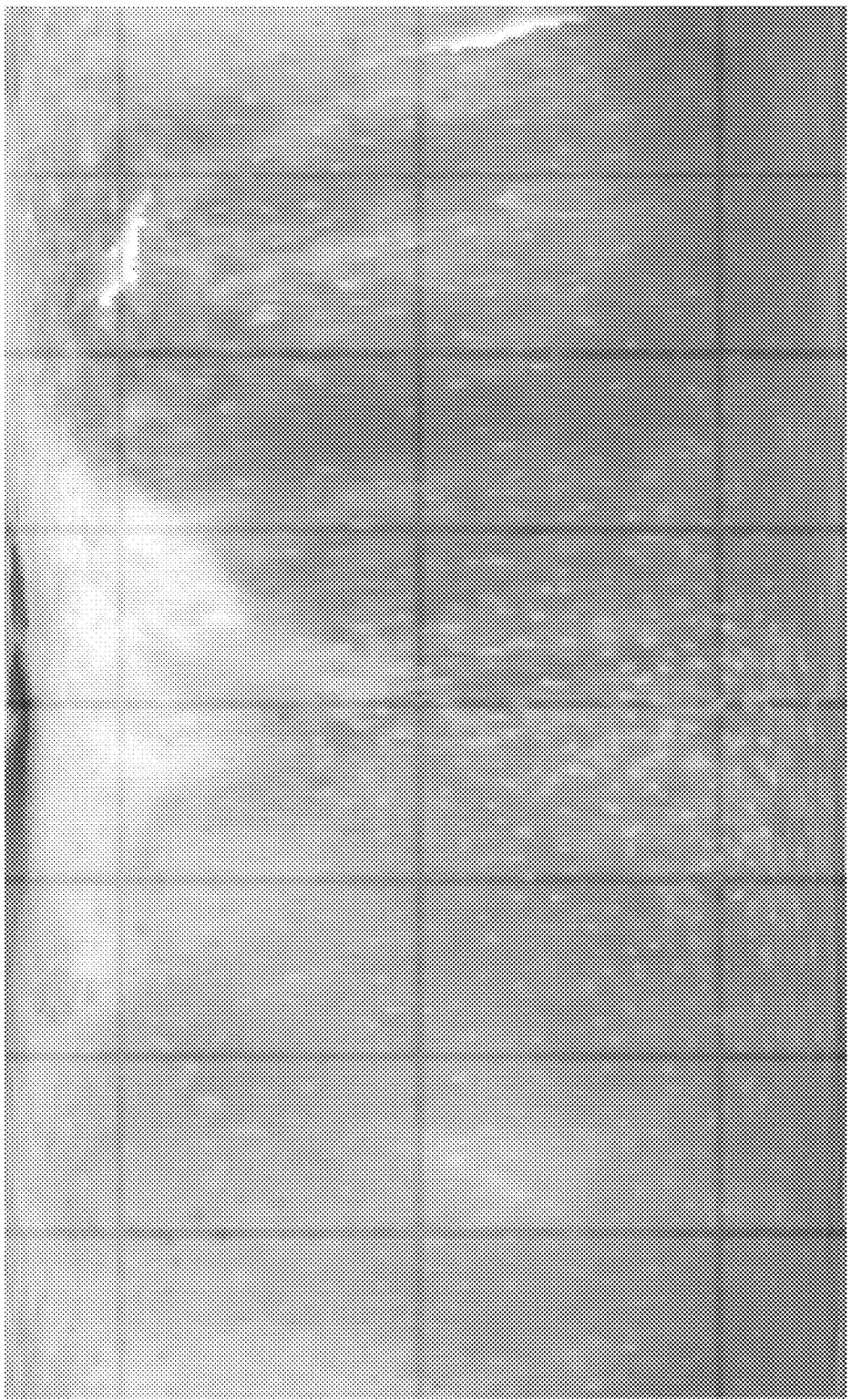

FIGS. 4 to 7 (4 in greyscale, the others originally in colour) show the collage of multiple images which were originally two-dimensional of the piece of fruit of FIG. 1, in order to obtain a three-dimensional image of it;

FIG. 8 shows a three-dimensional geometric model of the piece of fruit of FIG. 3 obtained with a careful measurement on the laser scanner;

FIG. 9 shows the overlaying of the three-dimensional image of FIGS. 4 to 7, on the geometric model of FIG. 8;

FIGS. 10 to 14 show five different digital images in greyscale, although the original images were in colour, of a same reference piece of fruit to be identified, in which the piece of fruit is positioned on a known background;

FIGS. 15 and 16 show two images of a reference piece of fruit, again in greyscale although the original images were in colour, which were obtained according to predetermined directions of examination, such that they practically entirely show the appearance respectively of the peduncle cavity and of the lower calyx of the apple;

FIG. 17 shows, in greyscale although the original images were in colour, the matching of two defects between a further photograph of the same reference piece of fruit as in FIGS. 10 to 14 and a virtual three-dimensional model of it; and FIG. 18 shows, in greyscale although the original images were in colour, a map projection of the lateral surface of an apple.

Although, for simplicity, all of the appended figures only show apples, this invention may be applied for any other type of piece of fruit.

The inventive concept which forms the basis of this invention has been, on one hand, that of keeping track of the data used for the classification and/or the performance of sorting, combined with enough information to allow recognition a posteriori of the piece of fruit and, on the other hand, providing a system for effectively recognising a posteriori the piece of fruit, in particular based on simple images of the piece of fruit itself. In that way, once the piece of fruit has been recognised, it is possible to retrieve the data acquired in the original scans which have been used or generated for the classification and/or the information relative to the subsequent sorting. In the case of an incorrectly classified piece of fruit, by inspecting what is retrieved, the operator will then be able to unambiguously understand the reason for the error and to correct it. In the case of a correctly classified piece of fruit, the operator will in any case be able to verify that the correct classification has been obtained in the correct way and not following errors.

In its most general embodiment, the method disclosed is a method for obtaining a posteriori information about the operation of a plant for automatic classification and sorting which automatically divides pieces of fruit into a plurality of different qualitative classes.

That method comprises an acquisition step, a processing step, a comparison step and an extraction step.

Although devised in order to allow understanding of the reasons for incorrect classifications and/or sorting, the method may be used for any piece of fruit which has previously been processed by the plant. Execution of the method therefore comprises initially identifying a piece of fruit amongst those which have been processed by the plant; in the context of this description and of the following claims the piece of fruit selected for execution of the method will be called the reference piece of fruit. Advantageously, the reference piece of fruit may be a piece of fruit for which the classification and/or the sorting have been incorrect.

During the acquisition step one or more digital images of the reference piece of fruit are acquired.

In some embodiments those digital images are acquired in the visible light band.

In some embodiments, the one or more digital images are acquired by means of a mobile device, such as the stills camera or video camera of a smartphone or a tablet.

In some embodiments the one or more digital images are acquired by means of a fixed scanning station which may be an integral part of the plant for automatic classification and sorting.

In some embodiments, in which multiple digital images are acquired, the images are constituted of independent digital photographs.

In some embodiments, in which multiple digital images are acquired, the images are constituted of successive stills of a digital film clip.

In some embodiments, during the acquisition step at least one or more digital images of the reference piece of fruit are acquired, according to one or more predetermined directions of examination. For example, if the piece of fruit is an apple, the predetermined directions of examination may be any direction which allows complete examination of the stalk cavity (peduncle cavity) or any direction which allows complete examination of the lower calyx (also called the small calyx). Alternatively, the predetermined direction of examination may be any directly substantially perpendicular to the axis of the piece of fruit (understood to be the line joining the stalk to the calyx in the apple, or the corresponding line passing through the stalk for other pieces of fruit). In the context of this invention substantially perpendicular to the axis means that the optical plane of the camera used is angled relative to that axis by an angle of less than 10°, a precision which can be guaranteed by any operator who attempts to acquire images according to a direction perpendicular to the axis. If during the acquisition step two or more digital images of the reference piece of fruit are acquired, it is preferable for those images to be acquired from different viewpoints. It is also preferable that, considered as a whole, the digital images acquired show as much of the surface of the reference piece of fruit as possible.

During the processing step, an electronic device processes the one or more digital images previously acquired, so as to identify a first group of individualizing features of the reference piece of fruit. In the context of this invention, individualizing features of any piece of fruit means features of the piece of fruit which, as a whole, are a sort of unique fingerprint of the piece of fruit, that is to say, capable of allowing it to be identified relative to all of the others. Such features may be linked to the shape of the piece of fruit, to the dimensions of the piece of fruit, to the colouring of the surface of the piece of fruit in one or more frequency bands, etc. Moreover, they may be expressed as absolute values (for example maximum circumference of the piece of fruit, average colour, stalk length, number of surface spots of a predetermined type, etc.) or as relative values/ratios (for example ratio of maximum radius to stalk length, colour distribution, etc.) or as a combination of both.

In some embodiments in which two or more digital images of the reference piece of fruit are acquired, during the processing step the digital images are combined to create a three-dimensional image of the reference piece of fruit. In order to be able to combine the various images, it is necessary to measure the rigid motion which the piece of fruit undergoes between the acquisitions of the various images; that may be done either by analysing the images themselves as already explained in patent application EP 2261643 A1 (whose content, to the extent that it is relevant, is incorporated herein for reference purposes), or by using additional information supplied for example by the accelerometers and gyroscopes which are often present in smartphones and in tablets. Alternatively it is also possible to position the piece of fruit on a known background (for example a sheet on which a known pattern is printed) and to acquire each digital image in such a way as to include both the reference piece of fruit, and at least part of the known background; in this way it is immediately possible to understand the relative position of the various images by simply examining how that image is projected (FIGS. 10 to 14). Therefore, the shape of the piece of fruit may be extrapolated starting with the texture or the outline of the piece of fruit which are visible in the digital images. In particular, it is known that by acquiring a plurality of images of the same object from different viewpoints, it is possible to reconstruct its three-dimensional shape by means of so-called "structure from motion" techniques (see https://en.wikipedia.org/wiki/Structure_from_Motion). Such techniques comprise first reconstructing the trajectory of the video camera relative to the object (real or apparent trajectory depending whether it is the video camera or the object which moves), and secondly calculating the three-dimensional shape (and if necessary also the texture, that is to say, the surface appearance in a specific band of wavelengths) starting with the images and with the calculated trajectory.

One method for making these algorithms simpler and more robust is to calculate the trajectory by also framing in the viewfinder simultaneously with the object an object having known features (such as a known background).

For example, by placing a chessboard pattern under or alongside the reference piece of fruit (under it in FIGS. 10 to 14) it is possible to calculate the relative position of the video camera relative to the reference piece of fruit for each acquisition (for example with algorithms such as that described in Zhang, Z. "A flexible new technique for camera calibration" (2000) IEEE Transactions on Pattern Analysis and Machine Intelligence, 22 (11), pp. 1330-1334).

By acquiring the shape and texture from various viewpoints it is then easy to put them together in order to reconstruct a single picture of the shape and texture of the part of the piece of fruit framed by the various images, obtaining a three-dimensional image of the piece of fruit.

During the comparison step, an electronic device which may be the same one which performed the processing step, or a different one, compares the first group of individualizing features identified for the reference piece of fruit, with each of a series of second groups of individualizing features. Each second group of individualizing features corresponds to a different piece of fruit which up until that moment has been processed by the plant for automatic classification and sorting.

For a correct application of this invention it is necessary for the individualizing features of each group to all be of the same type so that they can be compared with each other, but those of the first group may be fewer than those of each second group.

In fact, as is also described below, the individualizing features of each second group are features which are determined by a computer using electronic data which have been previously generated by the plant for automatic classification and sorting following an analysis of the processed piece of fruit. Since the electronic data available during classification are generally more than those generated during the acquisition step (for example during the classification step it is generally possible to have available at least one image for any point of the surface of the piece of fruit, something which may not be true for the digital images acquired during the acquisition step), it is easy to infer that for the pieces of fruit processed by the plant it is generally possible to identify a greater number of individualizing features.

In some preferred embodiments, the second groups of individualizing features are determined directly by the plant for automatic classification and sorting simultaneously with classification of the piece of fruit, and are saved in a database together with operating information relative to the operation of the plant. In particular, in the context of this description and of the following claims, the operating information may correspond to information used or generated by the plant for automatic classification and sorting for classification of the relative processed piece of fruit and/or to information about the sorting of the relative piece of fruit processed by the plant for automatic classification and sorting. In particular, the operating information may comprise all of the data which have been used to determine the classification of the processed piece of fruit, and any processing of that data, as well as the result of the classification step (qualitative class and/or outfeed zone assigned to the processed piece of fruit).

In contrast, in some embodiments, the second groups of individualizing features are determined by the electronic device which also determines the individualizing features of the first group. In this case, the electronic device will use the electronic data which, for each processed piece of fruit, the plant for automatic classification and sorting will have saved in the electronic database together with the operating information.

For example, when the one or more digital images are acquired according to predetermined directions of examination, the electronic device which performs the scanning step will be able to recognise which images amongst those acquired during the scan performed for the classification, have been acquired from the viewpoint most similar to that from which the digital images of the reference piece of fruit have been obtained.

The aim of the comparison step is to establish a match between the individualizing features of the first group and the individualizing features of at least one of the second groups. In general, there will be a match when the individualizing features of the first group, as a whole or individually, deviate from those of a second group by a deviation which is less than a predetermined margin of error. Consequently, given that many pieces of fruit may be very similar to each other, depending on the extent of the predetermined margin of error which is selected, it is possible that the result of the comparison step is the identification of a match between the first group of individualizing features and more than one second group of individualizing features. At that point it is possible to select only the second group which has the minimum deviation, or to select only several second groups which have the smallest deviations, or to select all of the second groups identified in this way.

In one embodiment, the individualizing features of the second groups may be constituted of the overall three-dimensional shape of the pieces of fruit, obtained for example by means of a laser triangulation scanner. The individualizing features of the first group may in turn be constituted of the three-dimensional shape of at least part of the reference piece of fruit, in contrast obtained for example with the techniques described above starting with the digital images.

In this case, the comparison step may consist of attempting to overlay the shape of part of the reference piece of fruit on one of the shapes of the already known processed pieces of fruit.

In fact, once a reconstruction of the reference piece of fruit has been obtained, it is for example relatively easy to attempt to (virtually) overlay it on the three-dimensional models measured by the plant for automatic classification and sorting, using the techniques known as "point cloud registration" (see for example https://en.wikipedia.org/wiki/Point_set_registration) which allow discovery of the rigid transformation which best overlays two objects. Furthermore, it is possible to use the same "point cloud registration" technique to assess how well it has functioned, and therefore how alike the shape of the two pieces of fruit effectively is.

In some embodiments, the same "point cloud registration" technique may in contrast be used to supply images aligned with texture-based matching. Texture-based matching is based on application of the technique known as "feature matching", whose most famous version is SIFT (https://it.wikipedia.org/wiki/Scale-invariant_feature_transform); however there are many other known versions and the relative source codes are also available free of charge. All of the cases involve identification of zones with interesting features in an image, and calculation for them of a series of numbers which characterise them (known as descriptors) in such a way as to be able to search to see if in the other image there are zones with a similar descriptor.

If two images of pieces of fruit have various zones with similar descriptor, in a similar configuration relative to each other, then they can be considered as coming from the same piece of fruit.

During the extraction step, which is also performed by an electronic device which may be the same one which performed at least one of the other steps or a different one, there is extraction from an electronic database, of the operating information associated with the second group of individualizing features for which, during the comparison step, the match with the first group of individualizing features has been established. If there are multiple second groups for which the match has been established, the operating information relative to each of them is extracted.

In one embodiment there may also be a making available step, wherein, by means of an electronic device (which again may or may not be the same one which performed at least one of the other steps), the operating information extracted from the electronic database is made available to an operator, generally by presenting it on a screen. If the second groups for which the match has been established are more than one in number, at this point the operator (who has the reference piece of fruit) will be able to decide once and for all which processed piece of fruit identified effectively corresponds to the reference piece of fruit.

In other embodiments, as described in more detail below, the operating information extracted from the database may be used to inspect any plant operating anomalies and, in some cases, to correct the ways in which the plant operates.

As described up to now, in order to implement the method according to this invention, it is necessary to have available either the second groups of individualizing features or, at least, the electronic data from which they can be obtained.

Although it is possible for the second groups of individualizing features, or the electronic data, to also be obtained outside of the method according to this invention (before its execution), in its preferred embodiment their obtainment is an integral part of the method according to this invention, constituting a preliminary step thereof. In this case, before the acquisition step, and for each piece of fruit processed by the plant for automatic classification and sorting, the method in fact comprises a generation step, a classification step, a sorting step and a saving step.

During the generation step, the plant for automatic classification and sorting acquires electronic data about the processed piece of fruit. The electronic data must be at least such that they can be used to identify the individualizing features of the processed piece of fruit, but, more generally, they are such that they can also be used to perform the classification of the piece of fruit. In other words, the electronic data used for recognition of the piece of fruit at least partly coincide with those used by the plant for automatic classification of the piece of fruit.

In line with that, during the classification step the plant for automatic classification and sorting uses the electronic data to classify the processed piece of fruit whilst, during the sorting step, the plant for automatic classification and sorting sorts the processed piece of fruit based on the classification performed during the classification step.

Finally, during the saving step the plant for automatic classification and sorting saves in the electronic database the operating information relative to the processed piece of fruit. The time for which the data and the information are stored in the database may vary according to requirements; for example it may be set as slightly longer than the maximum preservation time for the pieces of fruit (from a few days in the case of perishable pieces of fruit, to several months for pieces of fruit which are less perishable such as apples).

Figure 2:
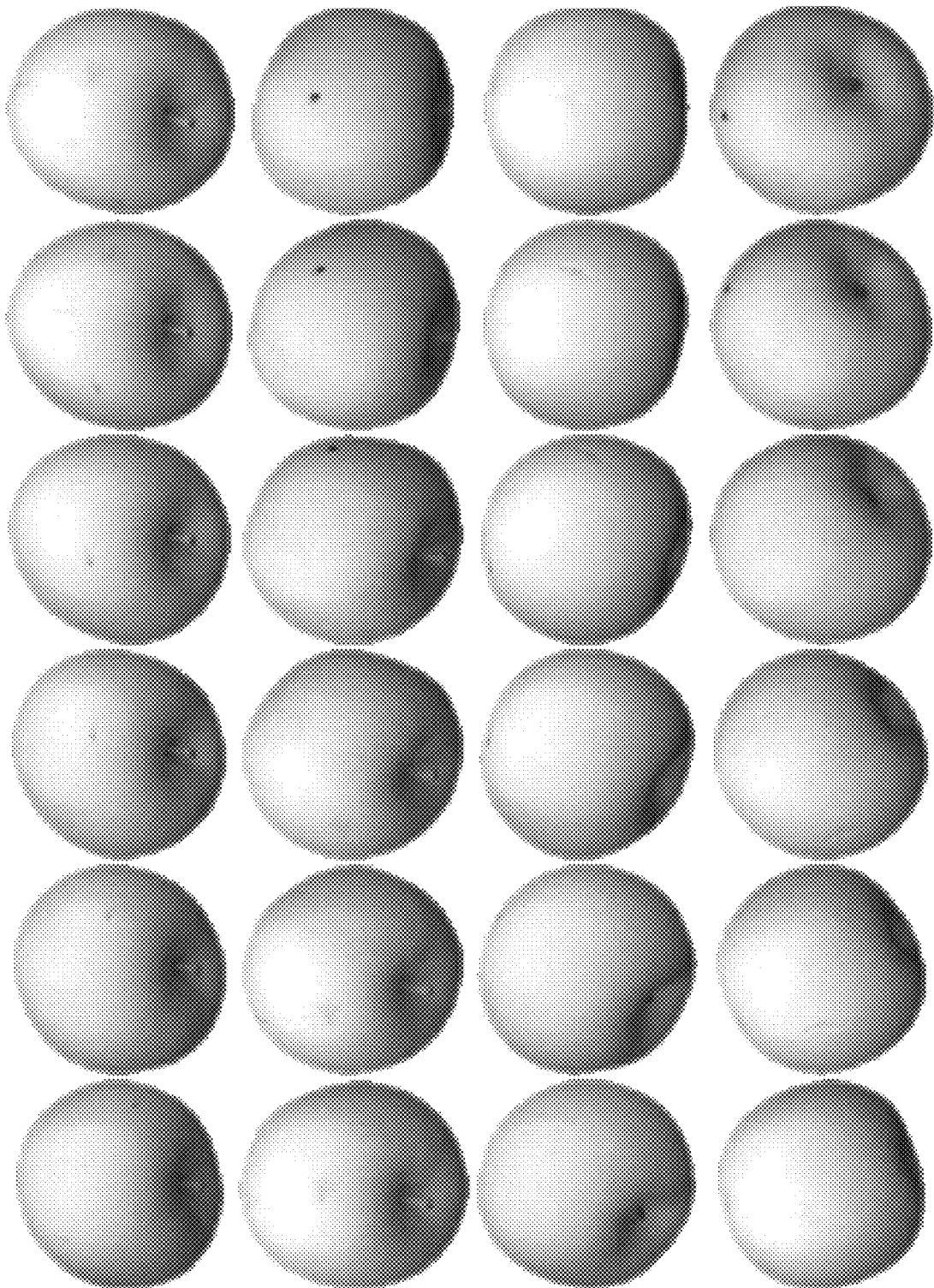
FIG. 2 shows a plurality of digital images of the same piece of fruit as in FIG. 1, which were acquired in the infra-red band, again in this case from a plurality of different viewpoints distributed around the piece of fruit.

FIGS. 1 to 3 shows the visual pictures of three types of electronic data which may be acquired during the generation step and which may then be combined in three-dimensional pictures.

In some embodiments, the electronic data relative to the features of each of the processed pieces of fruit, comprise a virtual model of the processed piece of fruit which, in turn, comprises a three-dimensional geometric model (obtainable for example by laser scanning the surface from multiple viewpoints—FIG. 3) with which images of the surface of the piece of fruit itself acquired in one or more bands of wavelengths (FIGS. 1 and 2) are combined. In this case, the second individualizing features may even be determined by processing virtual images of each processed piece of fruit which are generated starting with the relative virtual model, examining it virtually from any viewpoint.

Another possible approach consists of acquiring series of images of each piece of fruit, recognising the position with which the images have been acquired relative to the axis of the piece of fruit, and creating a single image which shows the entire surface of the piece of fruit using a similar picture to that of a planisphere for the Earth. This method, which is implemented by means of software, comprises acquiring a certain number of images from different positions of the piece of fruit, calculating the relative position from which the various images have been acquired and recognising where the axis of the piece of fruit is located relative to the images acquired. In order to identify the position of the piece of fruit, the software may use a priori information about the symmetry, or systems trained to recognise the position of the stalk and the calyx may be used, or systems capable of determining the three-dimensional shape of the piece of fruit. Once all of the data have been acquired, it is possible to merge them using known 3D stitching techniques. At this point it may be appropriate to use a map projection to show the overall information of the piece of fruit in a single two-dimensional image (at least as regards its lateral surface placed a certain distance from the "polar zones" of the piece of fruit). For that purpose any known method may be used, such as Mercator map projection.

Since it is notoriously difficult to suitably show the polar zones by means of Mercator map projection, it is however advisable to use three projections for each piece of fruit, combining the map projection of the lateral surface with two further projections for the "polar zones" which are based for example on universal polar stereographic projection (UPS). In the context of this invention "polar zones" are those near the intersection of the axis of the piece of fruit with the surface of the piece of fruit itself, which in general coincide with the zone near the stalk and that opposite to it.

FIG. 18 shows an example of Mercator map projection of the lateral surface of an apple, with highlighted projection grid.

It should be noticed that what is described above relative to the processing step, may also be implemented in a similar way during the generation step, and vice versa, if the electronic data similarly comprise digital images of each piece of fruit.

When the images of the reference piece of fruit, or those used during the generation step, have been combined in such a way as to create a map projection of the surface texture of the piece of fruit, advantageously the first group or the second group of individualizing features may be calculated by starting with the map projection.

Returning to the comparison step, considering the fact that each plant for classification and sorting processes a very large number of pieces of fruit, in various embodiments of this invention, advantageously the comparison step comprises first a selection step, in which, starting with a larger plurality of possible second groups of individualizing features, the series of second groups of individualizing features to be compared with the first group of individualizing features is selected.

In some embodiments the selection step comprises an estimation step, in which a classification date and/or a classification time for the reference piece of fruit are estimated, which correspond respectively to the date and to the time when the reference piece of fruit has been classified and sorted by means of the plant for automatic classification and sorting. The classification date and time can easily be established if there is a step of picking the reference piece of fruit from a plurality of pieces of fruit processed by the plant for automatic classification and sorting, the picking step being performed by either picking up the reference piece of fruit when it comes out of the plant for automatic classification and sorting, or selecting the reference piece of fruit inside a container comprising a plurality of processed pieces of fruit whose classification date and classification time are known.

In some cases the classification date and time may even be established afterwards, for example if they are indicated on a container which contains the pieces of fruit.

When the estimation step is required, during the selection step the second groups of individualizing features which relate to pieces of fruit processed by the plant for classification respectively on that classification date and/or at that classification time (understood as a time range) are selected.

In contrast, in some embodiments, the selection step comprises a step of measuring one or more dimensions of the reference piece of fruit and/or of a colouring of the reference piece of fruit (for example the average colouring), and during the selection step only the second groups of individualizing features which relate to processed pieces of fruit, which have dimensions and/or average colour similar to those measured (that is to say, which deviate from them by less than a predetermined margin) are selected.

In some embodiments, the selection step comprises a calculation step during which, based on features of the reference piece of fruit deducible from the digital images, a descriptor of the reference piece of fruit is calculated. This is followed by selection only of the second groups of individualizing features which relate to processed pieces of fruit which have a corresponding descriptor, which deviates from that of the reference piece of fruit by less than a predetermined value. The descriptors associated with the processed pieces of fruit to which the second groups of individualizing features refer, are advantageously descriptors previously calculated by the plant for automatic classification and sorting (in particular calculated at the same time as the classification step for the piece of fruit).

For example, a software, run by the electronic device, identifies several particular positions in the images acquired of the reference piece of fruit and calculates a descriptor for these. The selected zones will advantageously be zones which appear to have a variation in the image that is greater than others, either based on the colouring in the visible or in other wavelengths, or based on the shape of the piece of fruit. For example the software will more easily focus on the stalk, calyx or defects. That descriptor will be expressed as a number or a number code; for example in the literature there are very widespread ways of defining particular positions and descriptors in something like SIFT, SURF and many others. The same operation will also be performed during the processing step on the one or more images acquired of the reference piece of fruit; during the comparison step the match will be verified based on the similarity of the descriptors found.

In some embodiments, a deep neural network is used to calculate the descriptor. A descriptor of this type may be used either during the selection step, or as an element which is part of a second group of individualizing features.

It is known that one way of extracting groups of features from an image of a piece of fruit is that of training an autoencoder neural network [Hinton, Geoffrey E., and Ruslan R. Salakhutdinov. "Reducing the dimensionality of data with neural networks." science 313.5786 (2006): 504-507].

Other methods for reducing the dimensionality of data contained in an image so as to facilitate its compression, which may be used to calculate the descriptor, are presented in [Nanni, Loris, Stefano Ghidoni, and Sheryl Brahnam. "Handcrafted vs. non-handcrafted features for computer vision classification" Pattern Recognition 71 (2017): 158-172].

In contrast, a further method proposed in the context of this invention is as follows: selection of a set of pieces of fruit (for example 1000 pieces of fruit), acquisition of multiple images of each piece of fruit either by means of a scanner, or by means of a smartphone or another similar device. Selection of a neural network architecture for the classification of images (for example RESNET [He, Kaiming, et al. "Deep residual learning for image recognition." Proceedings of the IEEE conference on computer vision and pattern recognition. 2016]) and training it to recognise the piece of fruit photographed. If photographs of 1000 pieces of fruit are used, the network will have, as a final layer, a fully connected layer with 1000 outputs, where each output will adopt a value close to one if, and only if, at input there will be images of the piece of fruit corresponding to that output. Once the network has been trained, it will be possible to eliminate the final layer and to use the data which would have been in the final layer as descriptors of the piece of fruit itself. In this way, even in the case of new pieces of fruit relative to those used in the training, the descriptors will have been calculated in such a way as to represent the features most useful for identifying a piece of fruit.

When the digital images of the reference piece of fruit are acquired according to the predetermined directions of examination indicated above, the comparison step may be performed by comparing the digital images (and the first group of individualizing features identifiable in it) with corresponding virtual images of the piece of fruit which were created by the electronic device, starting with the three-dimensional image of the processed pieces of fruit, or starting with its map projection, as if they were acquired by a camera with an optical plane corresponding as closely as possible to that of the camera which acquired the digital images of the reference piece of fruit (for example aligned with the axis of the piece of fruit in such a way as to frame the stalk in the viewfinder). FIG. 17 shows an example of a comparison step performed in this way, using a single digital image of the reference piece of fruit, and a three-dimensional virtual model of the processed pieces of fruit to which the three-dimensional image is applied.

In the preferred embodiments, the method according to this invention is implemented on a plant for automatic classification and sorting, which comprises a conveying device, which defines a movement path for the processed pieces of fruit, and one or more analysis stations for analysing the features of the processed pieces of fruit, which are mounted along the movement path.

The movement path extends between an infeed zone and a plurality of outfeed zones, and each outfeed zone is associated with a different classification of the processed pieces of fruit.

The one or more analysis stations are upstream of the outfeed zones, and each analysis station generates electronic data about the features of each processed piece of fruit which passes through it.

As already indicated above, the features of the processed pieces of fruit comprise information about the three-dimensional shape of the processed pieces of fruit and/or information about the appearance of the surface of the processed pieces of fruit in one or more bands of wavelengths and/or information about the inside of the processed pieces of fruit.

The plant also comprises a computer which is operatively connected to one or more analysis station so as to receive from them the electronic data about the features of the processed pieces of fruit, and to the conveying device so as to control its operation.

Moreover, there is a tracking system for tracking the position of the processed pieces of fruit along the movement path, which is active at least between the one or more analysis stations and the outfeed zones. For example, the tracking system may comprise one or more encoders associated with the conveyor, if the conveying device is of the type with controlled feeding, or computerised vision systems capable of following each piece of fruit, in the case of a conveying device with free feeding of the pieces of fruit. The tracking system is operatively connected to the computer, for communicating to the computer the position of each processed piece of fruit, so as to allow the computer to sort each piece of fruit to the correct outfeed zone.

The plant also comprises an electronic database which is connected to the computer, and to which, in use, the computer saves the operating information relative to each processed piece of fruit.

The computer is programmed to assign a qualitative class to each processed piece of fruit based on the electronic data received from the one or more analysis stations about each processed piece of fruit, that is to say, to perform the classification step. It is also programmed to monitor the position of each processed piece of fruit along the movement path and to issue commands to the conveying device, for feeding each processed piece of fruit to a specific outfeed zone associated with the qualitative class assigned to the processed piece of fruit.

Furthermore, the same computer, once the one or more digital images of the reference piece of fruit are available, is also programmed to perform various steps described above, in particular the processing, comparison and extraction steps. If the making available step is required, the same computer may also be used to make available to an operator the operating information extracted from the electronic database (relative to one or more second groups of individualizing features).

As already indicated above, in some embodiments the method described so far may also be used in the context of an inspection of any plant operating anomalies.

Advantageously, the method for recovering a posteriori information about the operation of the plant for automatic classification and sorting, is used in a process for inspecting operating anomalies of a plant for automatic classification and sorting.

The starting point for this type of use is the identification, by an operator or by a further automatic checking system, of one or more pieces of fruit which have been incorrectly classified and/or sorted by the plant. Generally, an error of this type is revealed by the feeding of a piece of fruit to an incorrect outfeed zone.

For example when a quality control operator notices at an outfeed zone a piece of fruit with features which are not compatible with that outfeed zone, there can only be two reasons why that happened: either the piece of fruit has been incorrectly classified, or the piece of fruit, although correctly classified, has been incorrectly sorted towards the wrong outfeed zone.

In the context of the process for inspecting plant operating anomalies, that piece of fruit is adopted as the reference piece of fruit for executing the method for recovering a posteriori information about the operation of the plant for automatic classification and sorting.

Furthermore, in this case, during the extraction step there is extraction from the database even of virtual information about, respectively, the expected classification and/or the sorting which had been assigned by the plant to the reference piece of fruit (or rather to the processed piece of fruit which has been identified as corresponding to the reference piece of fruit). That virtual information may generally comprise the expected qualitative class or outfeed zone, which had been assigned to the processed piece of fruit.

The process for inspecting plant operating anomalies also comprises a step of obtaining real information about the classification and/or sorting error which has been noticed for the reference piece of fruit. This step too is performed by means of an electronic device, advantageously the same one used to obtain the digital images of the reference piece of fruit.

In some embodiments, obtaining the real information involves that information being supplied directly by the operator or by the automatic checking system.

Depending on the applications, the real information may comprise at least one of either the correct classification which should have been assigned to the reference piece of fruit, or identification of the correct outfeed zone to which the reference piece of fruit should have been fed; furthermore, it may also comprise identification of the incorrect outfeed zone to which the piece of fruit has been fed or, alternatively, the incorrect classification which has been assigned to the piece of fruit (in most cases there is a biunique correspondence between the classification and the outfeed zone assigned).

The process for inspecting anomalies therefore comprises a verification step during which the virtual information is compared with the real information; this step too is performed by an electronic device, advantageously the same one which performs the comparison step, acquisition step, etc.

Advantageously, during the verification step one or both of the following comparisons can be performed:
  a comparison between the real classification of the reference piece of fruit (resulting from the sorting) and the expected virtual classification; and
  a comparison between the expected outfeed zone and the real outfeed zone.

As can easily be inferred, if the real outfeed zone is different from the expected outfeed zone, a sorting error affecting the reference piece of fruit has occurred, probably due to mechanical problems; therefore, it will be possible for the anomaly to be immediately signalled to the operator so that he or she can check it, or it may simply be saved in order to prepare a statistical assessment of the anomalies detected. In the latter case operator intervention may only be required when the incidence of the anomaly exceeds a predetermined significant threshold.

In contrast, even when the error is in the classification/outfeed zone which has been assigned to the reference piece of fruit by the plant, the result of the verification step may be communicated to an operator and/or saved.

However, in some embodiments, when the error is in the classification/outfeed zone which has been assigned to the reference piece of fruit, the result of the verification step may be used to correct the operation of the plant. In particular, that is the case when the classification is determined by means of a computer which is programmed to assign the qualitative class to each processed piece of fruit by means of artificial vision algorithms, in particular using neural networks. In fact, in this case, the original operating information which was used by the plant for automatic classification and sorting for the classification of the relative processed piece of fruit (which corresponds to the reference piece of fruit), which has been extracted during the extraction step, is used as input data for a further training step for the artificial vision algorithms, combined with the information about the correct classification (also understood to be the outfeed zone-output data item).

It should be noticed that this further training step may be performed every time a certain number of cases of incorrectly classified pieces of fruit have been accumulated.

The technical solution just described is particularly useful and important because it allows the use for training of data for which the algorithm has not been trained enough. It should be noticed that when wrongly classified pieces of fruit are identified, the simplest solution would be to collect them, have them processed by the plant again, and use the new data generated in this way as an input training set, for a subsequent improvement. However, the problem is that during the second passage through the plant the piece of fruit would never be presented in precisely the same way as during the first passage, and in most cases it could end up being correctly classified, which would not help to improve the system. In contrast, being able to retrieve the images/the data which had caused the wrong classification, allows the system to be taught to correctly classify even in that condition.

The verification step and the further training step may be performed by the plant in a fully automated way once the results of the extraction step and the real information about the classification and/or sorting error are available.

This invention also relates to a plant for the classification and the sorting of pieces of fruit into a plurality of different qualitative classes, which comprises at least one computer programmed to implement the method according to this invention, at least from the processing step onwards.

Regarding the acquisition step, in some embodiments this is performed with a mobile device which is not part of the plant. In contrast, in other embodiments it may be performed by means of a fixed scanning station which is an integral part of the plant for automatic classification and sorting.

This invention brings important advantages.

Thanks to the provision of a method for recovering a posteriori information about the operation of the plant for automatic classification and sorting relative to each specific piece of fruit, every time it is established that a certain piece of fruit has been incorrectly classified and/or sorted by the plant, it is easy to recover all of the operating information relating to the classification and the sorting of the piece of fruit by the plant. By studying the operating information, the operator can easily understand what has not worked correctly and take the appropriate corrective action necessary.

Finally, it should be noticed that this invention is relatively easy to produce and that even the cost linked to implementing the invention is not very high.

The invention described above may be modified and adapted in several ways without thereby departing from the scope of the inventive concept.

All details may be substituted with other technically equivalent elements and the materials used, as well as the shapes and dimensions of the various components, may vary according to requirements.

The invention claimed is:

1. A method for recovering a posteriori information about the operation of a plant for automatic classification and sorting which automatically divides pieces of fruit into a plurality of different qualitative classes, the method comprising the following operating steps:
   an acquisition step wherein one or more digital images of a reference piece of fruit are acquired, where the reference piece of fruit is a piece of fruit previously processed by means of the plant for automatic classification and sorting;
   a processing step wherein the one or more digital images are processed by an electronic device, so as to identify a first group of individualizing features of the reference piece of fruit;
   a comparison step wherein an electronic device is used to compare the first group of individualizing features with each of a series of second groups of individualizing features each corresponding to a different piece of fruit processed by the plant for automatic classification and sorting, in order to establish a match between the individualizing features of the first group and the individualizing features of one of the second groups;
   an extraction step wherein an electronic device is used to extract from an electronic database operating information which corresponds to information used or generated by the plant for automatic classification and sorting for classification of a relative processed piece of fruit and/or to information about sorting of the relative processed piece of fruit processed by the plant for automatic classification and sorting, where in the electronic database the operating information is associated with the second group of individualizing features for which during the comparison step the match with the first group of individualizing features has been established.

2. The method according to claim 1 also comprising, before the acquisition step, and for each piece of fruit processed by the plant for automatic classification and sorting, a generation step, a classification step, a sorting step and a saving step, and wherein:
   during the generation step, the plant for automatic classification and sorting acquires electronic data about the processed piece of fruit, which can be used to identify the individualizing features of that processed piece of fruit;
   during the classification step, the plant for automatic classification and sorting uses the electronic data to classify the processed piece of fruit;
   during the sorting step, the plant for automatic classification and sorting sorts the processed piece of fruit based on the classification performed during the classification step; and
   during the saving step the plant for automatic classification and sorting saves in the electronic database the operating information relative to the processed piece of fruit.

3. The method according to claim 1 wherein the acquisition step is performed by means of a mobile device or in a fixed scanning station.

4. The method according to claim 1 wherein the acquisition step is performed by positioning the reference piece of fruit on a known background and acquiring each digital image in such a way as to include both the reference piece of fruit and part of the known background.

5. The method according to claim 1 also comprising, after the extraction step, a making available step, wherein, by means of an electronic device, the operating information extracted from the electronic database is made available to an operator.

6. The method according to claim 1 wherein the plant for automatic classification and sorting comprises:
   a conveying device which defines a movement path for the processed pieces of fruit which extends between an infeed zone and a plurality of outfeed zones, where each outfeed zone is associated with a different classification of the processed pieces of fruit;
   one or more analysis stations for analysing the features of the processed pieces of fruit, which are mounted along the movement path upstream of the outfeed zones, where each analysis station generates electronic data about the features of each processed piece of fruit and where the features of the processed pieces of fruit comprise information about the three-dimensional shape of the processed pieces of fruit and/or information about the appearance of the surface of the processed pieces of fruit in one or more bands of wavelengths and/or information about the internal part of the processed pieces of fruit;
   a computer operatively connected to the one or more analysis stations so as to receive from them the electronic data about the features of the processed pieces of fruit, and to the conveying device so as to control its operation;
   a tracking system for tracking the position of the processed pieces of fruit along the movement path, active at least between the one or more analysis stations and the outfeed zones, the tracking system being operatively connected to the computer for communicating to the computer the position of each processed piece of fruit; and
   an electronic database connected to the computer, to which, in use, the computer saves the operating information relative to each processed piece of fruit;
   and wherein the computer is programmed to:
   assign a qualitative class to each processed piece of fruit based on the electronic data received from the one or more analysis stations about each processed piece of fruit;
   monitor the position of each processed piece of fruit along the movement path;
   issue commands to the conveying device for feeding each processed piece of fruit to a specific outfeed zone associated with the qualitative class assigned to the processed piece of fruit;
   perform the processing, comparison and extraction steps.

7. The method according to claim 1 wherein during the acquisition step two or more digital images of the reference piece of fruit are acquired from different viewpoints, and wherein during the processing step the digital images are combined to create a three-dimensional image of the reference piece of fruit.

8. The method according to claim 1 wherein the electronic data relative to the features of each of the processed pieces of fruit, comprise a map projection of a virtual model of the processed piece of fruit, which comprises a three-dimensional geometric model with which images of the surface of the piece of fruit itself acquired in one or more bands of wavelengths are combined, and wherein the second individualizing features are determined by processing that map projection.

9. The method according to claim 8 wherein during the processing step a map projection is created from the three-dimensional image of the reference piece of fruit and wherein the first group of individualizing features is identified in that map projection.

10. The method according to claim 1 wherein the individualizing features of each second group have been determined by a computer using electronic data which have been previously generated by the plant for automatic classification and sorting following an analysis of the processed piece of fruit, and where the electronic data and/or the second groups of individualizing features are saved in the electronic database together with the operating information.

11. The method according to claim 10 wherein the electronic data relative to the features of each of the processed pieces of fruit, comprise a virtual model of the processed piece of fruit which comprises a three-dimensional geometric model with which images of the surface of the piece of fruit itself acquired in one or more bands of wavelengths are combined, and wherein the second individualizing features are determined by processing virtual images of each processed piece of fruit which are generated starting with the relative virtual model.

12. The method according to claim 1 wherein during the comparison step two or more second groups of individualizing features are identified which may correspond to the first group of individualizing features, wherein during the extraction step the operating information associated with each of those two or more second groups of individualizing features is extracted from the electronic database.

13. The method according to claim 12 also comprising, after the extraction step, a making available step, wherein, by means of an electronic device, the operating information extracted from the electronic database is made available to an operator, and wherein during the making available step all of the operating information extracted from the electronic database which is associated with each of the two or more second groups of individualizing features is made available to an operator.

14. The method according to claim 1 wherein the comparison step comprises first a selection step wherein the series of second groups of individualizing features to be compared with the first group of individualizing features is selected, from a plurality of second groups of individualizing features.

15. The method according to claim 14 wherein the selection step comprises an estimation step, wherein a classification date and/or a classification time for the reference piece of fruit when the reference piece of fruit has been classified and sorted by means of the plant for automatic classification and sorting are estimated, and wherein during the selection step second groups of individualizing features relative to pieces of fruit processed by the classification plant respectively on that classification date and/or at that classification time are selected.

16. The method according to claim 15 also comprising a step of picking the reference piece of fruit from a plurality of pieces of fruit processed by the plant for automatic classification and sorting, wherein the picking step is performed alternatively by picking up the reference piece of fruit when it comes out of the plant for automatic classification and sorting, and/or by selecting the reference piece of fruit inside a container comprising a plurality of processed pieces of fruit whose classification date and classification time are known.

17. The method according to claim 14 wherein the selection step comprises a step of measuring one or more dimensions of the reference piece of fruit and/or of a colouring of the reference piece of fruit, and wherein during the selection step second groups of individualizing features which relate to processed pieces of fruit which have dimensions and/or average colour similar to those measured are selected.

18. The method according to claim 14 wherein the selection step comprises a calculation step wherein, based on features of the reference piece of fruit deducible from the digital images, a descriptor of the reference piece of fruit is calculated, and wherein during the selection step second groups of individualizing features are selected which relate to processed pieces of fruit which have a corresponding descriptor which deviates from that of the reference piece of fruit by less than a predetermined value, where the descriptors associated with the processed pieces of fruit to which the second groups of individualizing features refer have been previously calculated by the plant for automatic classification and sorting.

19. The method according to claim 18 wherein each descriptor is calculated using the result of a penultimate layer of a deep neural network trained to identify each piece of fruit of a set of pieces of fruit.

20. The method according to claim 1 wherein during the acquisition step one or more digital images of the reference piece of fruit are acquired according to one or more predetermined directions of examination.

21. The method according to claim 20 wherein the predetermined directions of examination form and angle to the axis of the piece of fruit equal to $0°\pm10°$ or to $90°\pm10°$.

22. The method according to claim 20 wherein the comparison step is performed by comparing the digital images with corresponding virtual images of processed pieces of fruit which were generated by an electronic device starting with a three-dimensional reconstruction of a texture of the processed piece of fruit, as if they had been acquired by a camera positioned according to a same direction of examination.

23. A process for inspecting operating anomalies of a plant for automatic classification and sorting, which automatically divides pieces of fruit into a plurality of different qualitative classes, the process comprising execution of a method for recovering a posteriori information about the operation of the plant for automatic classification and sorting according to claim 1, adopting as the reference piece of fruit a piece of fruit which has been incorrectly classified and/or sorted, wherein during the extraction step there is extraction from the database of virtual information about, respectively, an expected classification and/or sorting assigned to the reference piece of fruit, the process for inspecting anomalies also comprising:
  a step of obtaining real information which comprises real information about a reference piece of fruit classification and/or sorting error, the step of obtaining real information being performed by means of an electronic device;
  a verification step during which the virtual information is compared with the real information, performed by means of an electronic device.

24. The process according to claim 23, wherein, a result of the verification step is communicated to an operator and/or saved.

25. The process according to claim 23, wherein, a result of the verification step is used to correct the operation of the plant.

26. The process according to claim 25, wherein the plant for automatic classification and sorting comprises:
- a conveying device which defines a movement path for the processed pieces of fruit which extends between an infeed zone and a plurality of outfeed zones, where each outfeed zone is associated with a different classification of the processed pieces of fruit;
- one or more analysis stations for analysing the features of the processed pieces of fruit, which are mounted along the movement path upstream of the outfeed zones, where each analysis station generates electronic data about the features of each processed piece of fruit and where the features of the processed pieces of fruit comprise information about the three-dimensional shape of the processed pieces of fruit and/or information about the appearance of the surface of the processed pieces of fruit in one or more bands of wavelengths and/or information about the internal part of the processed pieces of fruit;
- a computer operatively connected to the one or more analysis stations so as to receive from them the electronic data about the features of the processed pieces of fruit, and to the conveying device so as to control its operation;
- a tracking system for tracking the position of the processed pieces of fruit along the movement path, active at least between the one or more analysis stations and the outfeed zones, the tracking system being operatively connected to the computer for communicating to the computer the position of each processed piece of fruit; and
- an electronic database connected to the computer, to which, in use, the computer saves the operating information relative to each processed piece of fruit;

wherein the computer is programmed to:

assign a qualitative class to each processed piece of fruit based on the electronic data received from the one or more analysis stations about each processed piece of fruit;

monitor the position of each processed piece of fruit along the movement path;

issue commands to the conveying device for feeding each processed piece of fruit to a specific outfeed zone associated with the qualitative class assigned to the processed piece of fruit; and perform the processing, comparison and extraction steps;

and wherein the computer is programmed to assign the qualitative class to each processed piece of fruit by means of artificial vision algorithms, in particular neural networks, and wherein, when the verification step has identified a classification error, the information used by the plant for automatic classification and sorting for classification of the relative processed piece of fruit which was extracted during the extraction step is used together with information about a correct classification of the reference piece of fruit, for a further training step for the artificial vision algorithms.

* * * * *